A. RING.
Broadcast-Seeder.
No. 27,157.  Patented Feb. 14, 1860.
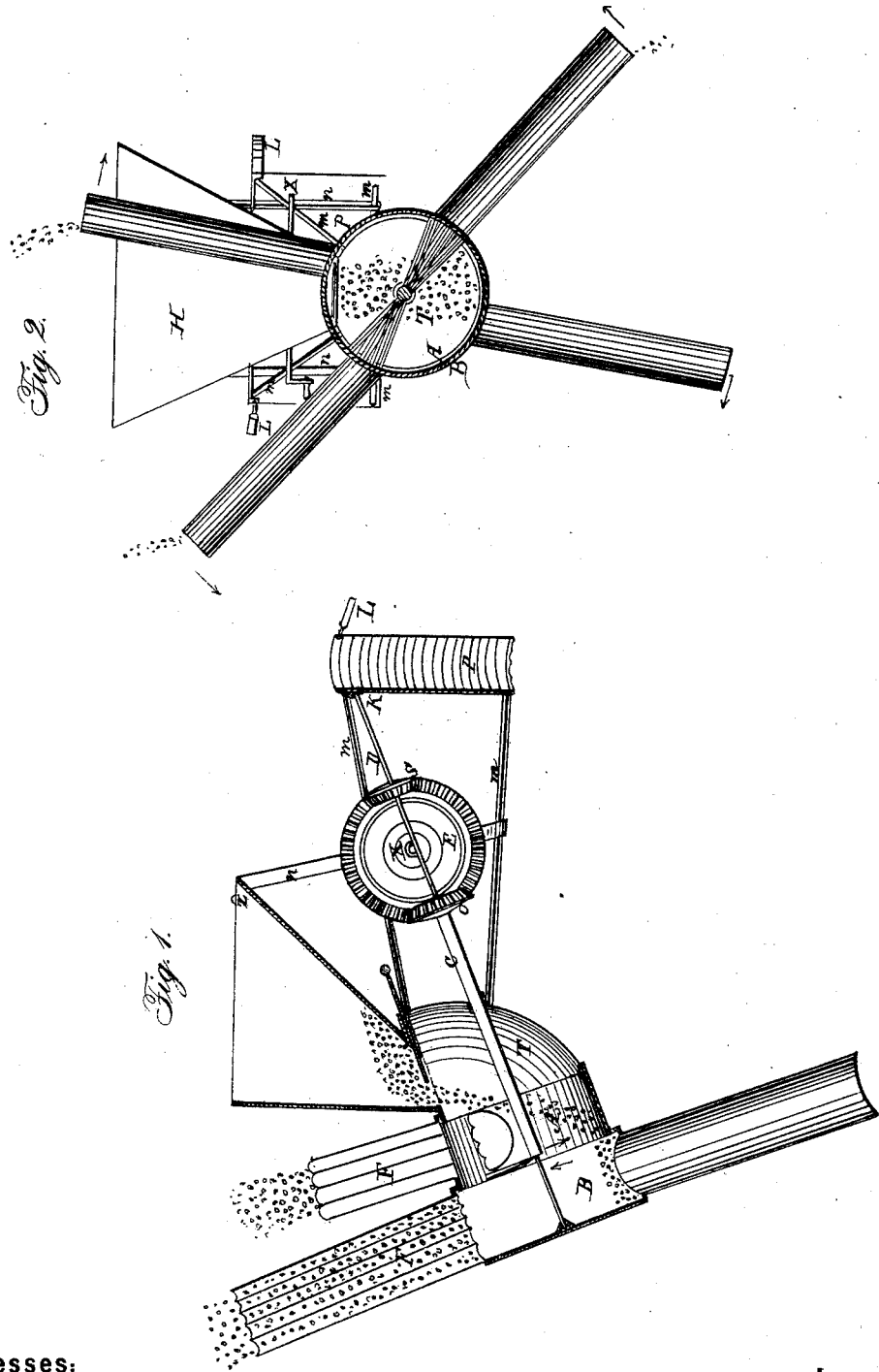
Witnesses:
Inventor:
Aaron Ring

UNITED STATES PATENT OFFICE.

AARON RING, OF WESTBROOK, MAINE.

IMPROVEMENT IN SEEDING-MACHINES.

Specification forming part of Letters Patent No. 27,157, dated February 14, 1860.

*To all whom it may concern:*

Be it known that I, AARON RING, of Westbrook, in the county of Cumberland and State of Maine, have invented a new and useful Improvement in Seeding-Machines, which I call "Ring's Equable Seed-Sower;" and I do hereby declare that the following is a full and exact description, reference being had to the accompanying drawings, making a part of this specification, in which—

Figure 1 is a longitudinal vertical section through the center of the shaft. Fig. 2 is an end view, showing interior of hubs and tube T.

The object of this invention is to furnish a machine that will sow broadcast wheat, barley, oats, rice, flax-seed, clover-seed, buckwheat, and grass-seeds of any specific gravity perfectly suent at any rate of speed ordinarily used in farming. To do this more perfectly than has ever yet been accomplished, I place two intermittent distributing-wheels upon the same axis, as A and B in the drawings, and turn them in opposite directions by means of two shafts, one within the other. The largest shaft, C, is hollow and shorter than the smaller one and turns the wheel A. The smaller shaft, D, is longest and turns the wheel B. These wheels are intended to revolve at the same rate of speed, so that should the team or operator go at a rapid trot and the wheel A throw too much toward the right of the cast the wheel B will throw as much to the left and make the cast all right, and vice versa. That the inside wheel, A, may not receive and distribute more than about one-half of the seed sown, the ends of the shafts on which these wheels are fastened are dropped until the shafts form an angle with the horizon of twenty to fifty degrees, or so that the seed will fall from the hopper H when the slide is drawn back far enough into the wheel A, as about one-half of it will go over into the wheel B and be sown therefrom. These machines can be made of any suitable material. I prefer stout tin-plate for a hand-machine, but iron would be more durable for a horse-power machine; but I do not confine myself to any particular material, as these machines may be constructed of several well-known materials or a number in combination, as wood, tin, iron, and copper combined. Motion may be communicated to these shafts C and D by beveled cogged wheels, as indicated in the drawings, Fig. 1, by large wheel E and two small wheels, O and S. The shaft X passes through the wheel E, and may be turned by the crank by hand, or the shaft may be long enough to receive bearing-wheels that will give motion to the wheel E as the machine is drawn along by horse or man, or as in the drawings.

P is a breast-plate; *m m m*, frame-work extending therefrom and connecting with the tube T, which conducts the grain from the hopper H into the wheel A. The shaft C has its bearing in the tube T and the shaft D inside of shaft C and at K in breast-plate P. The breast-plate can be fastened around the body of a man by the strap or band L and the weight of the load supported by a band or cord from the loops *z z* in the top of the hopper around the neck of the operator. The hubs of distributing-wheels A and B may be made about from three to six inches in diameter and from one to five inches long, with one, two, or more openings around the periphery of each, over which to fasten hollow tubes of suitable shape and size. The sides of these tubes along which the seed slides in sowing are fluted or corrugated, as at F. The hub A is open at both ends, the end next the hopper going on over the tube T and the opposite end into the wheel B.

I do not confine myself to cogged wheels or beveled gear to give motion to the shafts C and D, and thereby to the wheels A and B, as motion may be communicated by band-and-pulley connection or in any other well-known mode of communicating motion producing the same result—viz., turning two distributing-wheels in opposite directions, they being placed upon the same axis and intended to sow grain, seed, and fertilizing material broadcast.

I am aware that distributing-wheels have been used with hollow hubs and radial hollow spokes, as seen in the arrangements of Glendy Moody, William N. Tibbets, and A. Ring. Other wheels have been made with circular disks and radial flanges or plates, as in the arrangements of C. O. Luce, William Bullock, and E. K. Haynes, with hoppers to contain the seed, with slides at the bottom to regulate the flow or feed, and suitable tubes to conduct the grain, seed, &c., into the wheels. These I do not claim, as they are well known in the present state of the art; but

I claim—

The combination of wheel A, which is open at both ends, with wheel B, both wheels placed upon the same axis and rotating in opposite directions, in combination with two shafts, C and D, one within the other, substantially as and for the purpose set forth.

AARON RING.

Witnesses:
OSCAR F. DANA,
W. C. MANNING.